United States Patent [19]

Hunt et al.

[11] Patent Number: 4,597,865

[45] Date of Patent: Jul. 1, 1986

[54] ROTARY LIQUID SEPARATION UNIT

[76] Inventors: Arthur J. Hunt; Arthur J. Hunt, Jr., both of 400 Holly St., P.O. Box 1821, Ormond Beach, Fla. 32074

[21] Appl. No.: 691,182

[22] Filed: Jan. 11, 1985

[51] Int. Cl.$^4$ ............................................. B01D 33/10
[52] U.S. Cl. ...................................... 210/179; 210/178; 210/393; 210/394; 210/403; 210/184
[58] Field of Search ............... 210/393, 394, 402, 403, 210/784, 179, 184, 407, 408–412, 177, 178

[56] References Cited

U.S. PATENT DOCUMENTS

| | | | |
|---|---|---|---|
| 3,193,927 | 7/1965 | Ubbels et al. | 210/403 |
| 3,401,801 | 9/1968 | Wedmeyer et al. | 210/394 |
| 3,695,448 | 10/1972 | Johansson | 210/403 |
| 4,062,776 | 12/1977 | Blok | 210/403 |
| 4,248,709 | 2/1981 | Irving | 210/403 |
| 4,306,975 | 12/1981 | Siewert | 210/403 |
| 4,426,289 | 1/1984 | Svehaug | 210/403 |
| 4,507,202 | 3/1985 | Nord et al. | 210/403 |

Primary Examiner—Benoit Castel
Attorney, Agent, or Firm—Edward M. Livingston

[57] ABSTRACT

A cylindrically-shaped horizontal rotating unit which separates liquids from liquid-bearing materials, such as sludge or sewage, is the subject of this invention. After the liquid-bearing material is fed from a pipe onto a tray or head box located at the bottom of the feed end near the circumference of the unit, the material flows from onto the interior of the cylinder which contains bar screens around its circumference. The cylinder is rotated at variable speeds while the material is fed into it. When the cylinder is rotated liquids are drained from the material through bar screens contained around the circumference of the cylinder and into a drain pan below the cylinder thereby leaving the remaining material more solid. Additional features of this invention include interrupted pitched flights or blades protruding from the inside of the cylinder, which not only push the materials toward the discharge end of the cylinder but also roll the material end over end to remove even more liquid from the material. Also, a dam located at the discharge end of the cylinder can be adjusted to hold back the accumulated solids until the desired size and density are obtained. Finally, the solid material flows over the dam and onto a lip at the back of the cylinder ready for final disposal. Air and water spray systems are also provided to keep the bar screens on the interior of the cylinder clean from becoming clogged with particles of material being treated. A further optional feature is a heating chamber inside the cylinder which can be used to dry even further the material being treated.

3 Claims, 4 Drawing Figures

ROTARY LIQUID SEPARATION UNIT

BACKGROUND OF THE INVENTION

This invention relates to rotary separation units and more particularly to those units used to separate liquids from liquid-bearing materials, such as sludge or sewage.

Horizontal rotary screen units in the prior art were originally and still are used for gravel separations. The openings in the screens of said units are used to grade different sizes of sand and gravel. Later, using the same concept, smaller screens were used to dewater liquid bearing products in so far as letting free-run liquid pass through the screens. It was also found that tilting the rotary unit up on the feed end caused the solid material to flow down and out the discharge end. However, tilting the rotary unit in this manner performed this function only as well as the free-run water would drain through the screens. In many cases the water would not run through the screens properly and the treated material contained as much liquid as when it was fed to the rotary unit.

Even with such rotary units as described above, very fine materials would still be forced through fine screens due to the force with which the materials were fed from the pipe to the unit. In an effort to overcome this problem, some horizontal units in the prior art contained a box which became known as the "head box". The head box was installed inside the machine and its purpose was to slow down the liquid-bearing materials before they hit the screens of the rotary unit so that finer materials remained in the machine instead of piercing through the holes of the screen. Still, however, fibrous materials did not always move toward the discharge end so a series of pitched bars were installed. However, the pitched bars were not sufficient to move the material once the bars became covered with material.

A further problem with the rotary units in the prior art is that the screens inside the cylinder could not be removed easily after becoming clogged with particulates.

An even further problem with rotary units in the prior art is that there was very little control over the time the material spent in the unit, which time determines the dryness of the material discharged from the units.

The instant invention solves the problems associated with the prior art by providing a vastly improved rotary horizontal cylindrical unit which combines improved and novel features to yield an apparatus which can be utilized to separate liquids and solids with efficiency. Moreover, contrary to the rotary units of the prior art, the instant invention has a head box or tray which allows a wider but lower velocity stream to be released over a greater amount of screen area on the interior of the unit. The lower velocity stream eliminates shearing of the flocculated materials which are fed into the invention. Variable and changeable bar screens are also provided so that the size of screen openings can be varied and screens may be removed if and when they become clogged with materials.

Another novel feature, an adjustable dam, is provided at the discharge end of the apparatus. By varying the height of the dam, the "in time" and the dryness of the material being discharged can be controlled. In other words, if less liquid is desired in the end product then the higher the dam is placed. In addition, interrupted pitched and slanted flights or blades, increasing in height from feed to discharge end are provided throughout the interior of the cylinder to better push the sewage toward the discharge end of the device.

Additional features include an inside water backwash system and an outside airspray system which keep particulates from clogging the screen openings. A further optional feature is a heating chamber in the interior of the cylinder which further dries the material therein.

SUMMARY OF THE INVENTION

The overall object of this invention is to provide an apparatus which removes liquid from liquid-bearing materials in a variable and controllable manner.

A corollary feature is to provide an apparatus which can handle a greater volume of materials so that the process of removing liquids from said material can be improved substantially.

Another corollary object of the invention is to provide a rotary separation unit which does not become clogged with particulates from the liquid-bearing material.

This invention accomplishes these and other objects by providing a vastly improved rotary horizontal cylindrically shaped liquid separation unit with many novel features. The head box allows the material to be delivered at the immediate beginning of the cylinder, thereby increasing the "in time" of the material and reducing the "shear" resulting from the normally large drop from the head box onto the cylinder. In this manner the head box reduces the separation of the fine particles from the bulk of the materials thereby decreasing the probability that fine particles will clog the screens or pass through the screens with the liquid.

An additional novel feature of the instant apparatus is the easy variability and removability of the bar screens for cleaning or control of dryness. The bar screens can be changed merely by removing a half section of the screen at a time. Also the drain areas within the cylinder can be varied by removing the screens, to control the dryness of the end product. Moreover with the instant invention, the openings in the bar screens are varied from small at the feed end to large at the discharge end thereby allowing the liquids to continue to drain from the material even as the material becomes a larger and more solid mass.

Another novel and unique feature of the instant apparatus is the provision of interrupted pitched flights or blades of various heights from shorter at the feed end to longer at the discharge end on the inside of the cylinder. The purpose of these flights or blades is to push the material toward the discharge end while at the same time rolling the material over and over. This rolling action caused by the flights further removes liquid from the material. As further provided in this invention these flights can be added or removed depending on the speed with which the material is to be pushed toward the discharge end of the cylinder.

A further novel feature which assists in controlling the dryness of the end product is an adjustable dam provided at the discharge end of the cylinder. This adjustable dam can be raised or lowered to hold back the accumulated solids until built up to the desired size and weight to flow over the dam for final disposal. Thus, in this manner the adjustable dam further controls the moisture content of the discharged material.

To avoid the clogging of the screens associated with systems of prior art, high pressure flush systems are installed in this device. A water flush system on the right hand side along the center line of the unit flushes the screens with water there by removing any fine particles from the screens. An air flush system is provided on the outside of the cylinder to blow any particles off the screen and back onto the solid material on the floor of the cylinder. The airspray system further dries the material and also prevents the water from the material and water from the flush system from being carried around the cylinder (the "wagon wheel effect").

Finally, an optional feature is a heating unit inside the cylinder which can be used to further decrease the moisture content of the material.

In summary, the instant invention, by combining the novel features of a tray or head box, variable and removable bar screens, interrupted pitched flights, adjustable dam and water and air wash systems, provides a rotary unit which separates the liquid from liquid-bearing materials in greater volume faster and more efficiently.

DESCRIPTION OF THE PREFERRED EMBODIMENTS

Having described generally the background and objects of the invention it is now necessary to describe in detail the invention by reference to the drawings.

Figure 1:
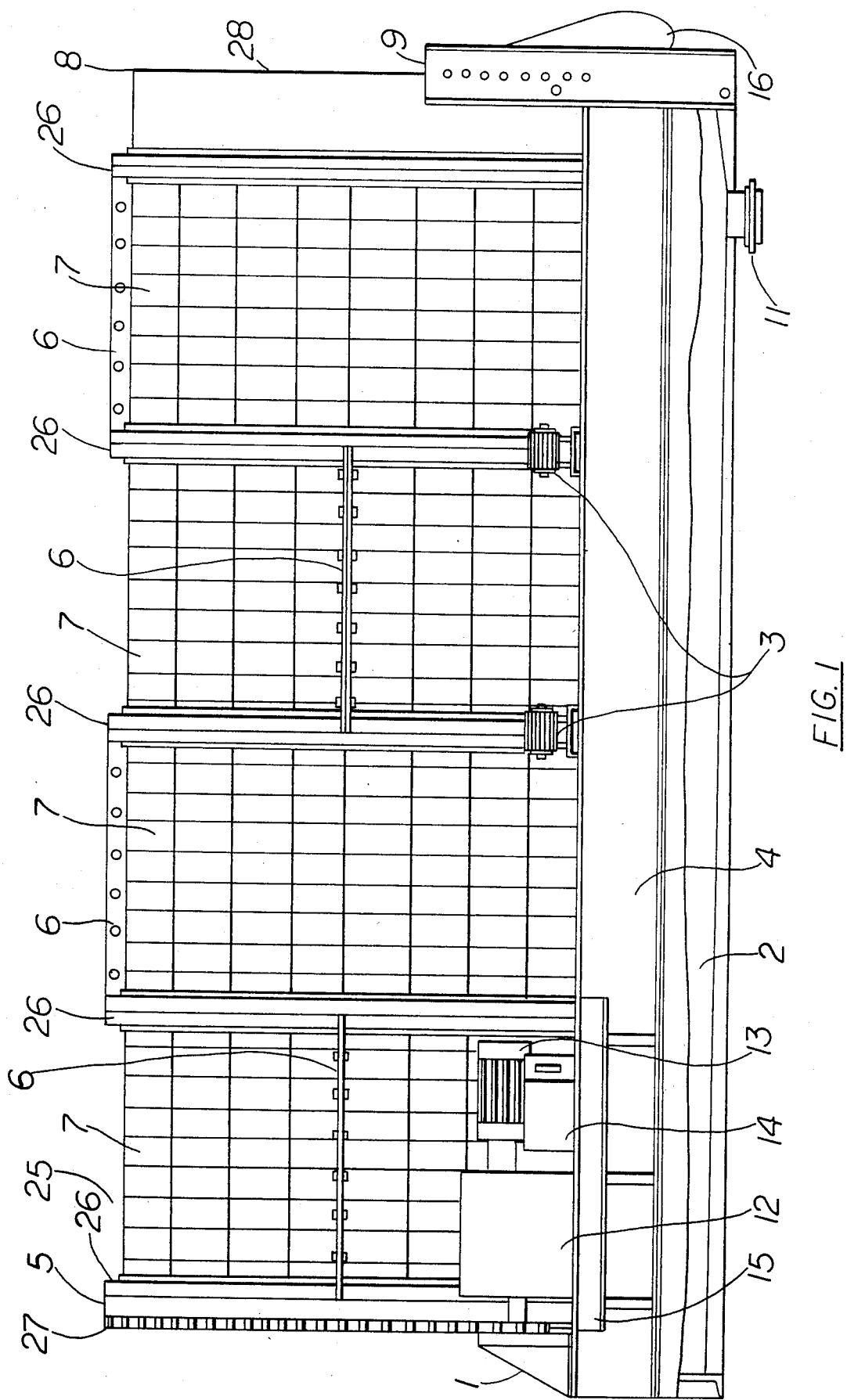
FIG. 1 is a side view of the apparatus, with partial cut away for the drain pan.

FIG. 1 illustrates a full side view of the apparatus itself. The cylindrical portion 25 of the apparatus consists of easily removable bar screens 7 which are held in place by metal weldments 6 interconnected with metal girdles 26 which surround the circumference of the cylinder 25. The cylinder 25 rests on rollers 3 which are attached to the frame weldment 4.

At the entrance of the cylinder is the feed tray 1 onto the middle of which liquid-bearing material such as sewage or sludge is placed. The feed tray 1 is attached to the frame weldment 4 which extends the entire length of the cylinder 25. Below the frame weldment 4 is a drain pan 2 shown in partial cut away, the purpose of which is to catch the liquid run-off. The drain pan 2 slopes downward toward a drain outlet 11 provided near the back of the frame weldment 4.

The cylinder 25 is rotated by an electrically-driven motor 13, attached to a gear box 12 which is controlled by a variable speed switch box 14 resting on a motor support 15 attached to the side of the frame weldment 4. The switch box 14 has a variable speed switch to control the speed of the rotation of the cylinder 25.

Finally, as further depicted in FIG. 1, at the discharge end of the cylinder 28 is an adjustable dam 9 which abuts the discharge end 28. Attached to the adjustable dam 9 is a downwardly and outwardly sloping lip 16 onto which the solid material falls for easy disposal.

Figure 2:
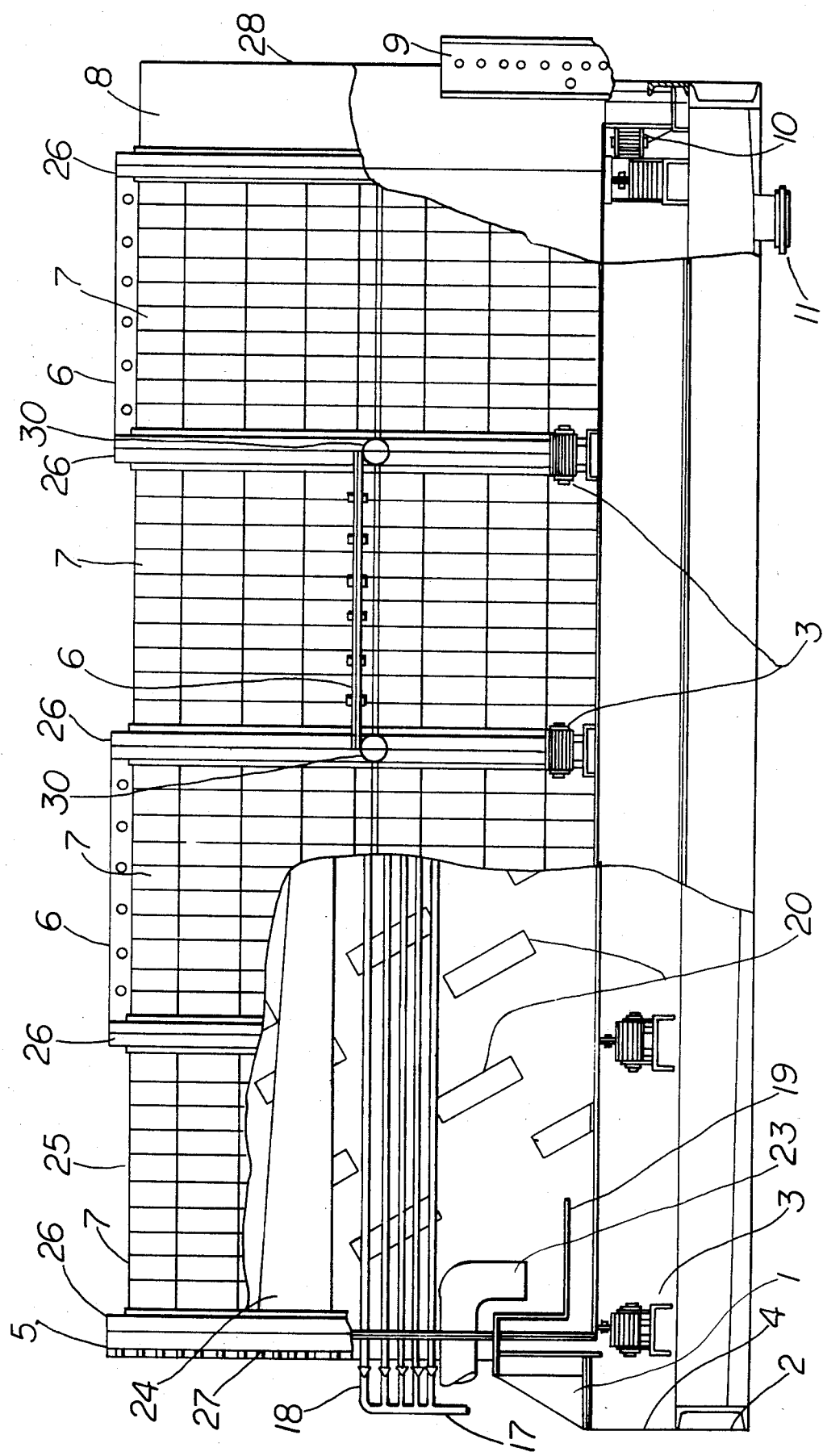
FIG. 2 is a partial cut away side view of the apparatus showing the water and air flush systems, pitched flights and optional heating unit.

The partial cut away side view of the apparatus in FIG. 2 better illustrates the interior of the cylinder 25. A pipe 23 feeds the liquid-bearing material onto the head box 19 from which it flows onto the floor of the cylinder 25. On the interior of the cylinder interrupted pitched flights or blades 20 are spaced around the inside of the cylinder 25. These removable pitched flights 20 are sized and alternated in such a manner so as to push the material toward the discharge end 28 of the cylinder as the cylinder 25 rotates. These flights or blades 20 vary in size—low at the feed end of the cylinder 5 and gradually higher as the discharge end 28 is approached. This special sizing is necessary to prevent the solid material from totally covering the flights 20 at the discharge end 28, thereby keeping the effectiveness of the flights. Also the number and pitch of the flights 20 can be varied to vary the period of time the material spends in the cylinder 25 in order to obtain the desired dryness of the material at the discharge end 28.

As further shown in FIG. 2, high pressure water and air flush systems are also provided to prevent clogging of the bar screens 7 by fine particles from the material being dried. The water flush systems pipes 17 may run the length of the cylinder 25. The water flush system pipes 17 are placed on the side along the center line of the inside of the cylinder 25 so that the water spray washes the particles off the screen 7 back onto the bottom with the solid materials being treated. At the same time most of the water goes through the screens 7 and into the drain pan 2 so as to not further dilute the material being treated. Even more important than the water flush system 17 is the air flush system 18 extending on the outside along the entire length of the cylinder 25. This system blows high pressure air through the screens 7 knocking the particles off the inside of the screen 7 back onto the solid material. Various turn knobs 30 at the beginning of each section of the cylinder 25 are used to govern what portion of the cylinder 25 receives the air blast. Finally, FIG. 2 shows the optional heating unit 24 which can be used to further dry the material.

Figure 3:
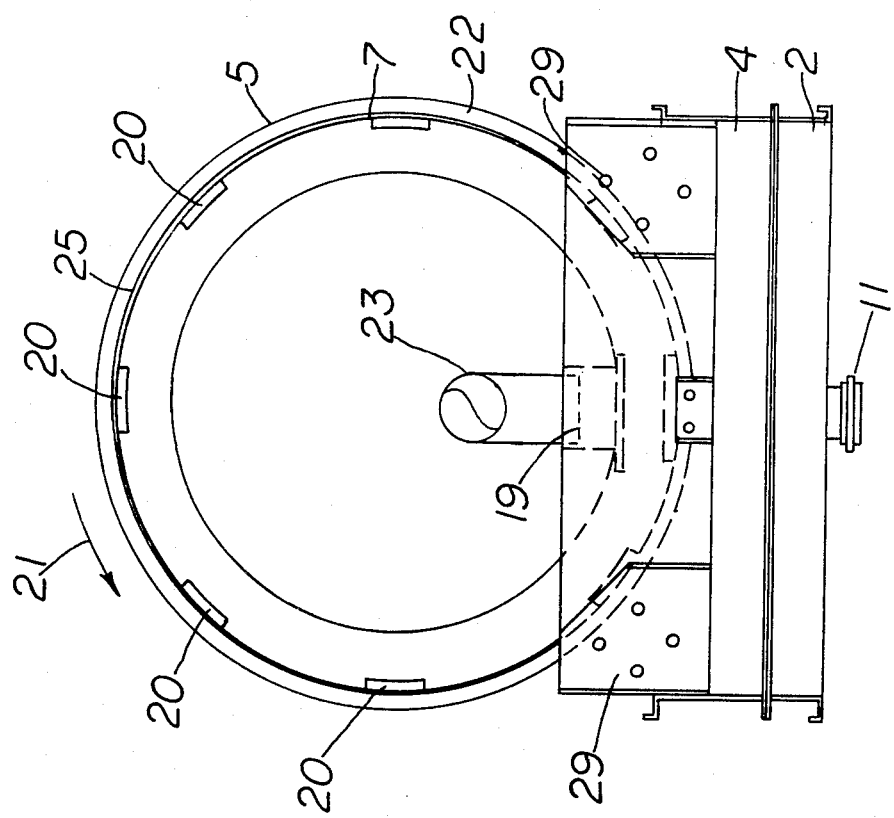
FIG. 3 is a front end view of the apparatus.

FIG. 3 shows a front end view of the invention. As seen in this view the cylinder portion 25 of the apparatus is supported at the front by braces 29 which are attached to the feed end ring 5 and girdles 26 along the length of the cylinder shown in other FIGS. The cylinder 25, of course, as shown in FIGS. 1 and 2 rests on support rollers 3 on the sides and underneath all of which facilitate the rotation of the cylinder 25, said rotation being in a counterclockwise direction as indicated by the arrow 21.

Figure 4:
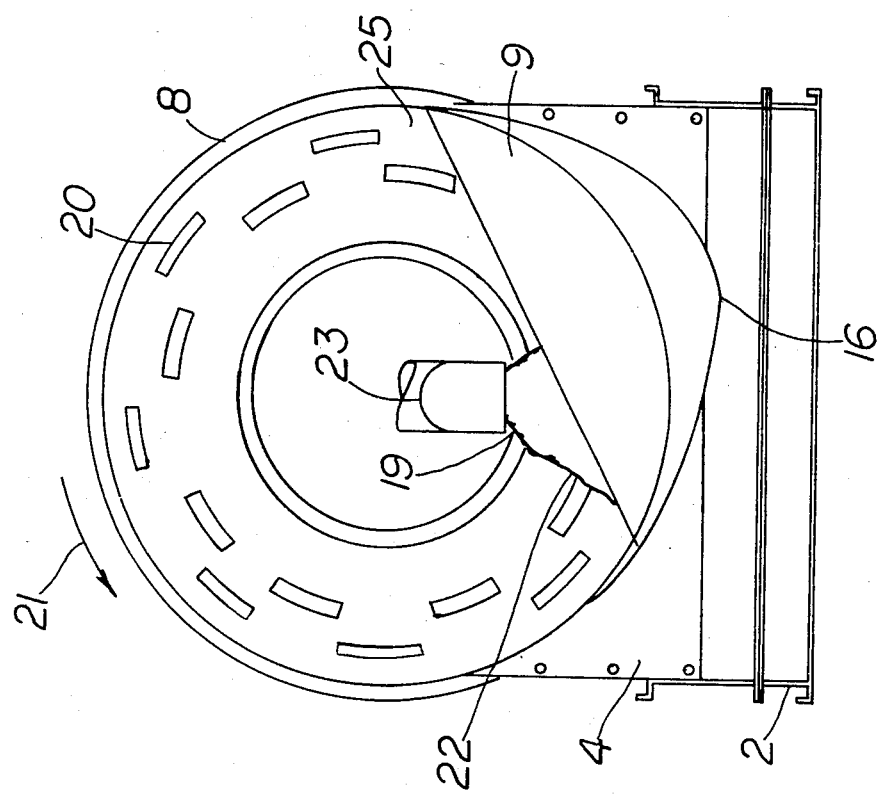
FIG. 4 is a rear end view of the apparatus showing the material being treated.

The rear view of the apparatus depicted in FIG. 4 shows how the interior of the cylinder 25 appears from the discharge end 28. As the cylinder 25 is rotated, liquid-bearing material 22 flows from the feed pipe 23 onto the head box 19 and onto the rotating cylinder 25. The cylinder 25 continually turns the material end over end thereby causing the liquid to run through the screened sides of the cylinder. With the help of the pitched flights 20 the materials 22 come together in a more solid mass 22 at the discharge end of the cylinder. The material 22 builds up against the adjustable dam 9 until it spills over the dam 9 and onto the downwardly and outwardly sloping lip 16 attached thereto for disposal. The dam 9 is adjustable upward or downward and even completely removable according to the dryness of the material desired.

Thus, in summary this invention provides a vastly improved horizontal cylindrical rotary liquid separation unit which combines numerous novel features, among those being variable and adjustable bar screens, a tray or head box, water and air flush systems, removable interrupted pitched flights, adjustable dam and an optional heating unit, all of which combine to yield a more controllable, efficient and effective apparatus for removing liquids from liquid-bearing materials.

This apparatus has proven most effective in the treatment of sewage sludge to yield a solid material which is easily disposable and usable as fertilizer or land fill. A corallary benefit of this invention is that liquids removed therefrom are clear and free from particles due to the sieve effect of the bar screens. The liquids then can be treated and utilized again for other purposes such as irrigation or even for drinking.

While some specific embodiments of the invention have been described in detail above, it is to be understood that various modifications may be made from the specific details described herein, without departing from the spirit and scope of the invention and thus, it is intended that such various modifications be included within the parameters of this patent application.

Having described in detail our invention, we claim the following:

1. An apparatus for removing liquids from liquid-bearing materials comprised of
   a horizontal cylinder resting on roller supports and rotatable by means of an electrically-driven motor and sprocket chain attached to a feed end of said cylinder;
   a box or tray located at the bottom of the feed end near the circumference of the cylinder which catches the liquid-bearing materials that go into the cylinder and discharges said materials onto the floor at the beginning of the cylinder as it is rotating thereby preventing shearing of said materials;
   removable and variable bar screens attached to the inside of the cylinder;
   removable flights or blades connected to and extending from the inside of the cylinder, said flights slanted toward the feed end and spaced at desired intervals throughout so as to push the solid material toward a discharge end of the cylinder;
   a dam which abuts the discharge end of the cylinder and is adjustable upward or downward to control the material processing time;
   a four-sided supporting weldment having roller supports on the sides and underneath thereof onto which the cylinder rests with a drain pan in the bottom thereof, the floor of which slopes toward a drain outlet near the back of the drain pan;
   a water flush system in the interior of the cylinder consisting of a pipe extending along the inside wall of the cylinder and spray nozzles pointing outwardly toward the wall of the cylinder through which water is forced to clean the bar screens on the interior of the cylinder; and
   a high pressure air spray system on the exterior of the cylinder consisting of a pipe extending along the outside wall of the cylinder with spray nozzles pointing inwardly toward the wall of the cylinder from which air is forced through the screens to remove the particles.

2. The apparatus of claim 1 with a heating element or heating unit extending lengthwise in the upper center of the cylinder for further drying the liquid-bearing material.

3. The apparatus of claim 1 wherein said pitched flights or blades gradually increase in size from shorter at the feed end to greater at the discharge end on the inside of the cylinder.

* * * * *